(12) United States Patent
Paget et al.

(10) Patent No.: US 11,509,682 B1
(45) Date of Patent: Nov. 22, 2022

(54) SYSTEM AND METHOD FOR COMPUTATION OF RANSOMWARE SUSCEPTIBILITY

(71) Applicant: NormShield, Inc., Boston, MA (US)

(72) Inventors: Paul Paget, Hingham, MA (US);
Ferhat Dikbiyik, Sakarya (TR);
Candan Bolukbas, Stone Ridge, VA (US)

(73) Assignee: NormShield, Inc, Boston, MA (US)

( * ) Notice: Subject to any disclaimer, the term of this patent is extended or adjusted under 35 U.S.C. 154(b) by 0 days.

(21) Appl. No.: 17/476,210

(22) Filed: Sep. 15, 2021

(51) Int. Cl.
*H04L 9/40* (2022.01)
*G06N 3/04* (2006.01)

(52) U.S. Cl.
CPC .......... *H04L 63/1433* (2013.01); *G06N 3/04* (2013.01)

(58) Field of Classification Search
CPC .............................. H04L 63/1433; G06N 3/04
See application file for complete search history.

(56) References Cited

U.S. PATENT DOCUMENTS 9,294,498 B1 * 3/2016 Yampolskiy ............ H04L 67/10
9,830,569 B2 11/2017 Dahlberg
(Continued)

FOREIGN PATENT DOCUMENTS

WO WO-2018216000 A1 * 11/2018 ........... G06F 21/554
WO WO-2019051507 A1 * 3/2019 ........... G06F 21/554
(Continued)

OTHER PUBLICATIONS

Cyber Threat Susceptibility Assessment; https://www.mitre.org/publications/systems-engineering-guide/enterprise-engineering/systems-engineering-for-mission-assurance/cyber-threat-susceptibility-assessment, The Mitre Corporation, retrieved Apr. 22, 2020, 7 pages.

(Continued)

*Primary Examiner* — Sarah Su
(74) *Attorney, Agent, or Firm* — Rauschenbach Patent Law Group, PLLC; Kurt Rauschenbach

(57) ABSTRACT

A method of cyber-risk assessment includes populating a database with ransomware attack information non-intrusively gathered from a plurality of data sources. A request for a ransomware susceptibility assessment of an entity associated with a domain name is received. A digital footprint of an entity is discovered in response to the associated domain name using non-intrusive information gathering. Commercial information associated with the entity is collected in response to the domain name. The database is scanned in response to the discovered digital footprint and at least one ransomware factor associated with the entity is generated in response to the scan. An impact parameter and a ransomware factor coefficient is computed based on the collected commercial information. Then an entity susceptibility index is computed based on the impact parameter, the ransomware factor coefficient, and the at least one ransomware factor. A ransomware attack is then identified and the database is re-populating in response to the identified ransomware attack. At least one of impact parameter or a ransomware factor coefficient is re-computed based at least one of an impact parameter or a ransomware factor coefficient based on the identified new ransomware attack to provide a cyber-risk assessment.

19 Claims, 6 Drawing Sheets

(56) References Cited

U.S. PATENT DOCUMENTS

| | | | |
|---|---|---|---|
| 9,973,524 | B2 | 5/2018 | Boyer et al. |
| 10,257,219 | B1 | 4/2019 | Geil et al. |
| 10,268,976 | B2* | 4/2019 | Rasumov ............ H04L 63/1483 |
| 10,425,380 | B2 | 9/2019 | Dahlberg et al. |
| 10,438,001 | B1 | 10/2019 | Hariprasad |
| 10,546,135 | B1 | 1/2020 | Kassoumeh et al. |
| 10,949,543 | B1* | 3/2021 | Bolukbas .............. G06F 21/577 |
| 10,951,658 | B2 | 3/2021 | Putz et al. |
| 10,963,572 | B2 | 3/2021 | Belfiore et al. |
| 10,984,112 | B2 | 4/2021 | Agarwal |
| 10,986,117 | B1 | 4/2021 | Agbabian et al. |
| 2005/0066195 | A1 | 3/2005 | Jones |
| 2011/0252479 | A1 | 10/2011 | Beresnevichiene et al. |
| 2017/0187745 | A1 | 6/2017 | Ng et al. |
| 2018/0115577 | A1* | 4/2018 | Shukla ................... G06F 21/55 |
| 2018/0146004 | A1 | 5/2018 | Belfiore, Jr. et al. |
| 2018/0181761 | A1* | 6/2018 | Sinha .................... G06F 21/577 |
| 2018/0351976 | A1* | 12/2018 | Shitrit-Efergan ... H04L 63/1458 |
| 2019/0034845 | A1 | 1/2019 | Mo et al. |
| 2019/0182289 | A1 | 6/2019 | White |
| 2019/0207981 | A1* | 7/2019 | Sweeney ............ H04L 41/0816 |
| 2019/0364073 | A1 | 11/2019 | Jones |
| 2020/0090197 | A1 | 3/2020 | Rodriguez et al. |
| 2020/0162485 | A1* | 5/2020 | Jevans ................... G06Q 20/02 |
| 2020/0204574 | A1* | 6/2020 | Christian .............. H04L 9/3239 |
| 2020/0404012 | A1* | 12/2020 | Pichetti ................ H04L 41/046 |
| 2021/0075814 | A1* | 3/2021 | Bulut .................... H04L 63/102 |
| 2021/0099477 | A1* | 4/2021 | Hunt .................... H04L 63/1433 |
| 2021/0216630 | A1* | 7/2021 | Karr ......................... G06F 21/57 |
| 2022/0050896 | A1* | 2/2022 | Ahmed ................. G06F 21/552 |

FOREIGN PATENT DOCUMENTS

| | | |
|---|---|---|
| WO | 2019144039 A1 | 7/2019 |
| WO | 2021/216307 A1 | 10/2021 |

OTHER PUBLICATIONS https://attack.mitre.org, retrieved Apr. 22, 2020, 3 pages.

Sarfone et al., "Technical Guide to Information Security Testing and Assessment" Sep. 2008, National Institute of Standards and Technology, U.S. Department of Commerce, Special Publication, 800-115, 80 pages.

Non Final Office Action received for U.S. Appl. No. 17/229,024 dated Jun. 16, 2021, 21 pages.

Non Final Office Action received for U.S. Appl. No. 16/855,282 dated Jun. 18, 2020, 16 pages.

Notice of Allowance received for U.S. Appl. No. 16/855,282 dated Nov. 18, 2020, 18 pages.

"Notification of Transmittal of the International Search Report and The Written Opinion of the International Searching Authority, or the Declaration" for PCT/US2021/026751, Aug. 19, 2021, 12 pages, the ISA/KR, Korean Intellectual Property Office, Republic of Korea.

* cited by examiner $$\frac{D \times I \times T \times S \times \sum_i \min(c_i, p_i \times n_i)}{N}$$

SYSTEM AND METHOD FOR COMPUTATION OF RANSOMWARE SUSCEPTIBILITY

The section headings used herein are for organizational purposes only and should not be construed as limiting the subject matter described in the present application in any way.

INTRODUCTION

Ransomware attacks are increasing cyber threats to many organizations including private and public sectors. The ransomware is a malicious software that enables cyber criminals to obtain and/or encrypt data in the computer systems of the target organization. The ransomware groups, also known as ransomware gangs, are criminal organizations that request ransom from target organization in exchange for providing the encryption key or extort by threating the target organization with exposing sensitive information. The monetary amount of ransom and remediation cause significant costs to organizations. As such, systems and methods to identify, analyze and describe susceptibility to ransomware of organizations' cyber systems are needed.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

FIG. 3 illustrates an embodiment of an equation to compute the ransomware susceptibility according to the present teaching.

DESCRIPTION OF VARIOUS EMBODIMENTS

Figure 1A:
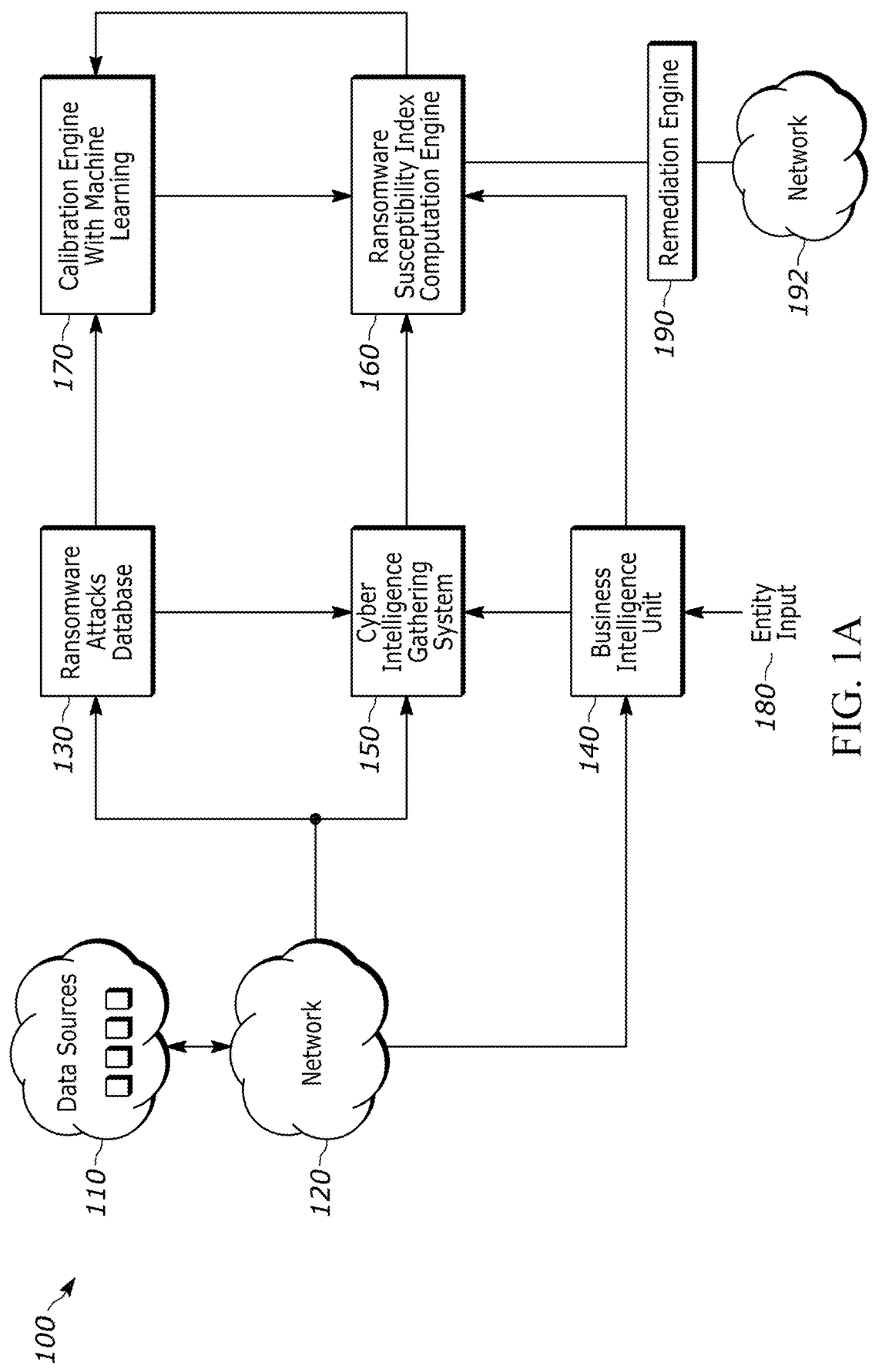
FIG. 1A illustrates a block diagram of an embodiment of a system that computes the ransomware susceptibility for a given entity with non-intrusive data gathering according to the present teaching.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings can be performed in any order and/or simultaneously as long as the teaching remains operable. Furthermore, it should be understood that the apparatus and methods of the present teachings can include any number or all of the described embodiments as long as the teaching remains operable.

Ransomware was the most common threat to organizations in 2020, especially operations in finance, e-commerce, and healthcare. In addition to security incidents, ransomware also had the highest impact on victims' production, reputation, and finances.

Ransomware groups need to infiltrate the target organization's computer systems to install and activate the ransomware. Their attack methods to infiltrate an organization's systems vary, and include, for example, using e-mail phishing and/or exploiting a hardware and/or software vulnerability on the target organization's cyber systems that allow remote code execution.

Most known measures against ransomware attacks consider post-attack scenarios such as detection of ransomware in the computer systems or backing up sensitive data on a separated network. However, considering the tactics, techniques, and procedures (TTPs) of the ransomware group, it is possible to determine a metric that indicates how much an organization is susceptible to ransomware attacks.

The computation of ransomware susceptibility is important not only for organizations themselves but also for the third-party companies, e.g., vendors, business partners, etc., that they work with. While the digital transformation creates large ecosystems that connect organizations digitally connected to each other, it also provides cyber criminals opportunities to execute ransomware attacks through a third-party company. For instance, a ransomware attack to a manufacturing vendor that serves a technology company may allow sensitive information and computer resources to be in the hands on the attackers to make ransom demands from the technology company.

The ransomware is a malicious software that enables cyber criminals to obtain and/or encrypt data in the computer systems of the target organization. The ransomware groups, also known as ransomware gangs, are criminal organizations that request ransom from target organization in exchange for providing the encryption key or extort by threating the target organization with exposing sensitive information. The monetary amount of ransom and remediation cause significant costs to organizations. It is important to improve and/or augment the organizations' cyber systems so those systems can identify, analyze and compute susceptibility to these attacks.

One feature of the apparatus and method of the present teaching is that it addresses the challenges in a way that it can provide such a ransomware susceptibility metric (called ransomware susceptibility index) to provide an indicator for possible ransomware attacks for an organization's digital ecosystem, which includes both the organization itself and its third-party companies (e.g., vendors).

When a user of the system and method in the present teaching provide an entity input 180, which is the main domain name of the entity, the system and the method can compute the ransomware susceptibility index of the entity automatically.

One aspect of the present teaching is the use of technical and business-related findings (e.g., number of employees) gathered with non-intrusive methods to compute the ransomware susceptibility index of an entity. It should be understood that the present teachings can be embodied in various methods, systems and/or non-transitory computer readable storage medium.

The term "non-intrusive" as used herein refers to the commonly understood meaning of the term applied to the collection of data over a network. The concept of non-intrusive data gathering is described in Open Source Intelligence (OSINT) documents. In particular, security assessments are described in certain NIST publications, such as NIST Special Publication No. 800-115 in, for example, Sections 2.3 and 2.4. In addition, the concept for non-intrusive data gathering is described in the MITRE's ATT&CK framework, in particular under the Technical Information Gathering section. See, for example, the description of acquiring of OSINT data sets and information.

One example of what we mean by non-intrusive gathering of data over a network is to collect data without requiring the active participation of the entity associated with the data. This generally means that no human intervention is required. Another example of what we mean by non-intrusive gathering of data is to collect data with minimal or essentially no interruption to the operation of the entity associated with the data. That is, the non-intrusive gathering of data essentially does not disturb the entity associated with the data in a significant way and generally does not require active participation persons associated with the entity. It should be understood that the meaning of non-intrusive gathering is not based on whether or not permissions are granted from an entity. Permissions are not particularly relevant as cyber criminals do not ask for permission.

FIG. 1A illustrates a block diagram of an embodiment of a system 100 that provides non-intrusive data gathering and computation of ransomware susceptibility according to the present teaching. The system 100 relies on information non-intrusively gathered from a variety of data sources 110 that are publicly and/or privately accessible. The data sources 110 can be, for example, any data source that is free-to-use and/or a paid/subscriber-based source. For example, data sources can include data providers, websites, internet forums, web crawler, honeypot, data collector, internet-wide scanners, news sites, paste sites, regulatory authorities, reports, social sites, and/or internet sites residing in the deep web or darknet. The data sources 110 are reachable through a communication network 120 that is also connected to computer resources that are used to execute the method of ransomware susceptibility computation and implement the system 100 according to the present teaching.

An entity input 180, i.e., domain name, should be provided to the system 100 in order to compute the ransomware susceptibility of an entity. In various embodiments, a user may provide this entity input, or the entity input may be electronically generated, or some combination of input method may be provided. The entity associated with the entity input 180 may be a third-party entity so that the user can obtain a ransomware susceptibility computation for the third-party's cyber risk.

The entity input 180 is provided to a business intelligence unit 140. The term unit as used herein is a descriptive text consisting of two computing engines, a digital asset discovery engine 141 and a business data gathering engine 142, as described later in connection with FIG. 1B. The term engine as used herein refers to software that executes codes to perform certain calculations based on given inputs and the computer resources used to execute that software. The computer resources used to execute the application may refer to, but are not limited to, partial resources of hardware associated with a computer system that has one or more CPUs, RAMs, ROMs, data storage units, I/O adapters, and communication adapters.

In some methods according to the present teaching, the business intelligence unit 140 discovers a digital footprint and business data of the entity based on the associated domain name and based on non-intrusively gathered information from a computer network 120 and from various connected data sources 110. The business unit 140 is in communication with a cyber intelligence gathering system 150 that fetches a list of technical findings that is generated using the non-intrusively gathered information from the computer network 120 and from the data sources 110 and that is based on the discovered digital footprint of the entity and also produces technical findings from non-intrusively gathered data. The term database as used herein refers to one or more data storage units that reside in local computer system (server) or mainly in a distributed cloud environment (servers or blades). The storage units are connected to input/output adapters that write and read information. These distributed storage units can be accessed with the use of database management software (DBMS), which is a computer program that interacts with end users, applications, and the database itself to capture and analyze the data. The servers or blades are the physical hardware that must have one or more data storage drive (e.g., hard disk drive), processors (CPUs), power supply units, cooling units, and communication adapter (network interface).

The business intelligence unit 140 is also in communication with a ransomware susceptibility index computation engine 160 to provide digital footprint size and business-related data used in the computation of ransomware susceptibility.

A ransomware attacks database 130 stores statistical information related to real ransomware attacks, for example, the industry, size, country, and digital footprint of the target organization, the attack method, the cyber identity of the attacker, etc., that is generated using the non-intrusively gathered information from the computer network 120 and from the data sources 110. The database is in communication with the cyber intelligence gathering system 150 and also with a calibration engine 170 that works on machine learning principles and by using machine learning algorithms and processing techniques. For example, Convolutional Neural Network (CNN) for regression prediction can be used in the calibration engine 170.

The cyber intelligence gathering system 150 is in communication with the ransomware susceptibility index computation engine 160 to provide necessary technical parameters for the computation of ransomware susceptibility.

The calibration engine 170 that works on machine learning principles is in communication with both the ransomware attacks database 130 and the ransomware susceptibility index computation engine 160 to gather statistical and computed data, respectively. It uses these data with machine learning algorithms to better estimate the coefficients used in the computation of the ransomware susceptibility index; and it provides re-estimated coefficients to the ransomware susceptibility index computation engine 160.

The output of the ransomware susceptibility index computation engine 160 can be provided to a remediation engine 190. The remediation engine 190 can make adjustments to various parts of the cyber infrastructure that can reside in a network 192 and that are associated with one or more entity being assessed or with the user. The adjustments can reduce a vulnerability to ransom attacks of cyber infrastructure associated with the one or more of the entities that are analyzed by the cyber-risk assessment system 100 or the user organization(s). Remediation can include, for example, removing, changing or otherwise modifying a cyber element relating to the ransomware susceptibility. In some embodiments the remediation includes adjusting the computer infrastructure (hardware and/or software) so that a new and/or improved condition can be realized and/or changing the cyber security stance of one or more entities. The cyber elements may be part of and/or operating over a network 192. The network 192 may be in all or in part, the same as network 120.

Figure 1B:
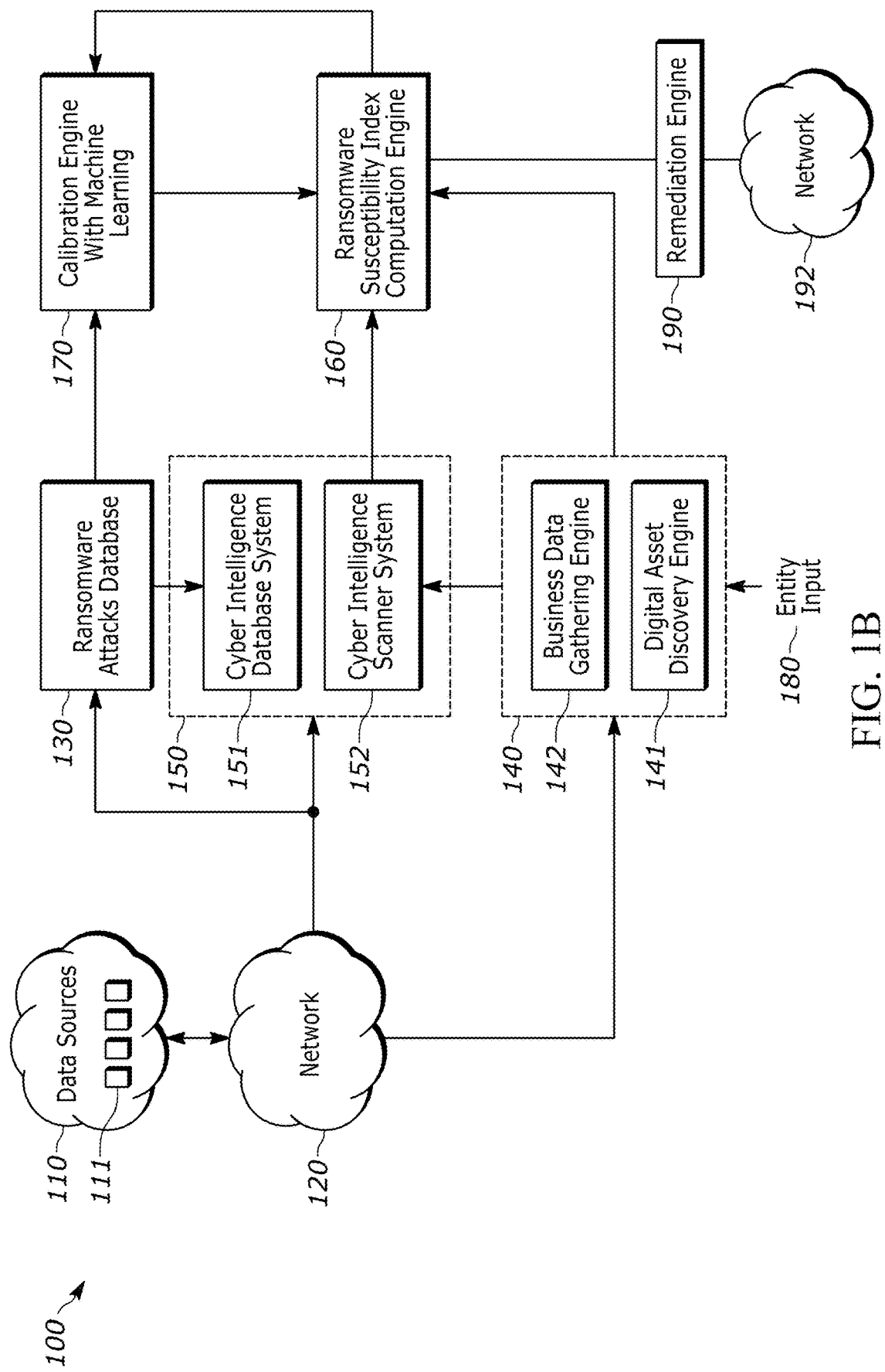
FIG. 1B illustrates a block diagram with subsystem detail of an embodiment a system that computes the ransomware susceptibility for a given entity with non-intrusive data gathering according to the present teaching.

FIG. 1B illustrates a block diagram with subsystem detail of an embodiment of a system 100 that computes the ransomware susceptibility index for an entity. The relevant data is gathered from data sources 110 that comprises individual data sources 111 that are publicly or privately accessible. The data sources 110 can be any data source free-to-use or paid/subscriber-based source. For example, a particular data source 111 can be a data provider, website, forum, web crawler, honeypot, data collector, internet-wide scanner, news sites, paste sites, regulatory authorities, reports, social sites, a site residing in deep web or darknet (i.e., a website that can be reachable with only special tools, methods, etc.). That is, a particular data source 111 can be any data source that provides information about an "entity" and that can be reachable through a communication network 120. The communication network 120 can be one or more networks to which various databases in the cyber intelligence database system 151 and the ransomware attacks database 130 are in communication with, including, for example, various public and private networks and internetworks that operate over a variety of wired and/or wireless infrastructure. One skilled in the art will appreciate that the term "entity" as used herein generally refers to any organization, corporation, firm, company, or institution associated with a network domain name.

The domain names (i.e. entity inputs 180) of an entity are input to a business intelligence unit 140 that consists of a digital asset discovery engine 141 and a business data gathering engine 142. The digital asset discovery engine 141 determines the internet-facing assets of an entity using non-invasive techniques that require no human intervention. A determined description of all or nearly all of the internet-facing assets of an entity is referred to herein as a digital footprint. One skilled in the art will appreciate that the term "asset" as used herein generally refers to internet metrics such as domains, Internet Protocol (IP) addresses, blocks of IP addresses, subdomains, Domain Name Server (DNS) records, websites, Autonomous System Numbers (ASN), which is a unique number assigned to an autonomous system by the Internet Assigned Numbers Authority (IANA), web services, social media accounts, e-mail addresses, and/or other internet-facing element that belongs to digital footprint of an entity.

The business data gathering engine 142 collects commercial information, including industry information and/or business related information that are meaningful for targeting the entity from a ransomware group's/cybercriminal's perspective. Industry information is related to the industry or industries in which the entity participates while business-related information is specific to the entity. Industry information can include, for example, statistics about vulnerabilities and/or attacks in various industries, including attack vectors and ransomware attack frequency and size for a particular industry. Business information can include, for example, employee size, annual net revenue, country, industry, market value, etc. using non-invasive techniques that require no human intervention.

An engine as described herein is a software application that executes code to perform certain calculations based on given inputs. These engines also include the computer resources used to execute that software, which can be, but are not limited to, computer hardware resources such as one or more of CPUs, RAMs, ROMs, data storage units, I/O adapters, and communication interfaces.

A cyber intelligence gathering system 150 comprises cyber intelligence database system 151 and cyber intelligence scanner system 152. The cyber intelligence database system 151 non-intrusively gathers information from data sources 110 through the communication network 120.

At least some of the databases in the cyber intelligence database system 151 communicate with a cyber intelligence scanner system 152. The cyber intelligence scanner system 152 is also in communication with the business intelligence unit 140. The cyber intelligence scanner system 152 scans the information in the databases of the cyber intelligence database system 151 with respect to the outputs generated by the asset discovery engine 141.

The cyber intelligence database system 151 including one or more of databases can be implemented as, for example, one or more data storage units that reside in a local computer system and/or reside in a distributed cloud environment (servers or blades). The local computer system can, for example, be a conventional computer server. The distributed cloud environment is often rack based computer servers and/or blades. The servers or blades are physical hardware that can have one or more data storage devices (e.g., hard disk drive), processors (CPUs), power supply units, cooling units, and communication adapter or network interface. The data storage units can be connected to input/output adapters to write and read information. These data storage units, which in some embodiments are distributed data storage units, can be accessed with the use of database management software (DBMS). Database management software is a computer program that interacts with end users, applications, and the database itself. Database management software allows users, applications, and/or a database to capture and analyze data, store data in the database and access data in the database.

The cyber intelligence scanner system 152 is in communication with a ransomware susceptibility index computation engine 160 and the outputs of the cyber intelligence scanner system 152 are sent to the ransomware susceptibility index computation engine 160. The outputs of the cyber intelligence scanner system 152 provide the results for each ransomware factors (as described below in connection to the description of FIGS. 2A-2B) to ransomware susceptibility index computation engine 160.

One feature of the present teaching is that an initial ransomware susceptibility index request proceeds automatically with only information about domain name or domain names associated with an entity. The system is able to compute the ransomware susceptibility index by only passive, non-intrusive data gathering.

In some embodiments, a ransomware susceptibility index is requested for an entity, and the system provides ransomware susceptibility index related to the request. As an example, a request for the domain name is examplesite.com for an entity of interest called Example Corporation (Example Corp.).

The asset discovery engine 141 non-intrusively gathers the digital footprint information about Example Corp. from data sources 110 through the communication network 120. The digital footprint information includes, for example, the domain names (e.g., examplesite.com), IP addresses (e.g., 91.195.240.126), subdomains (e.g., community.examplesite.com, orums.examplesite.com, etc.), domain name server (DNS) Records (which includes, for example, A records, MX records, Namerservers, and any other related records), services (e.g., HTTP, FTP, Telnet/SSH, etc.), servers and/or their versions used by the entity (according to information gathered from data sources 111), social media accounts of the entity (including, but not limited to, Twitter, Facebook, Linkedin accounts), AS numbers (e.g., AS47846), and/or e-mail addresses (e.g., forms@examplesite.com).

The business data gathering engine 142 non-intrusively gathers business related information about Example Corp. from data sources 110 through the communication network 120. The business-related information includes, for example, country, industry, number of employees, the annual revenue, and the market size of the company. The business-related information is referred to herein as business-related parameters.

While the digital asset discovery engine 141 sends the digital footprint size value, which can be represented by a number in a certain range, e.g., between 0 and 10, to the ransomware susceptibility index computation engine 160; the business data gathering engine 142 also sends business-related parameters to the ransomware susceptibility index computation engine 160.

After obtaining the digital footprint information, the digital asset discovery engine 141 triggers cyber intelligence scanner system 152 by giving a digital footprint of the entity as inputs. Some of the scanners in the cyber intelligence scanner system 152 executes their search on the related databases in the cyber intelligence database system 151. Some other scanners in the cyber intelligence scanner system 152 may execute their search on the related data sources 110 through the communication network 120.

The results provided by the scanners in the cyber intelligence scanner system 152 are referred to herein as ransomware factors. The ransomware factors are technical findings that indicate possible vulnerabilities and/or other cyber weaknesses used for ransomware attacks. The ransomware factors are sent to the ransomware susceptibility index computation engine.

The ransomware susceptibility index computation engine 160 then computes the ransomware susceptibility index for the Example Corp based on the ransomware factors sent by the cyber intelligence scanner system, digital footprint size information sent by the digital asset discovery engine 141, and business-related parameters sent by the business data gathering engine 142.

The ransomware susceptibility index computation engine 160 sends ransomware susceptibility index number, which can be represented by a real number between 0.0 and 1.0, to the calibration engine with machine learning 170 along with digital footprint size and business-related parameters.

The ransomware attacks database 130 is updated periodically, and/or using an on-demand basis, from data sources 110 through the communication network 120. The individual data sources 111 include, for example, ransomware groups websites, news websites that provide information on ransomware attacks, and research reports on the ransomware attacks and/or groups.

In some embodiments, after a new entry is made in the ransomware attacks database 130, the calibration engine 170 checks the business-related parameters, digital footprint size, and ransomware factors of the targeted entity. A pattern can be detected for similar entities by the calibration engine 170 with the use of machine learning techniques. In response to the detected pattern, the calibration engine can redefine some coefficients used in the computation of ransomware susceptibility index and provide these to the ransomware susceptibility index computation engine 160. Then, the ransomware susceptibility index for Example Corp. may be re-computed by the ransomware susceptibility index computation engine 160 based on the new coefficients.

One feature of the present teaching is that the ransomware susceptibility computation system 100 supports the ability to change the susceptibility of the cyber infrastructure of an entity. This can be accomplished using a remediation engine 190 to adjust a cyber element residing in, for example, a network 192 and associated with one or more of the entities being analyzed and/or with the user organization. The network 192 may be the same or different from the network 120 used to gather data source information. The ransomware factors are related to technical findings that indicate possible vulnerabilities and/or other cyber weaknesses used for ransomware attacks. These vulnerabilities reside in a variety of computer processes, including hardware and software that is part of the cyber infrastructure of the entity and/or organization. This can include, for example, identification of or means to propagate malware, a configuration of a computer hardware of software system of the entity, a computer hardware or software asset vulnerability, and/or a computer hardware or software access and/or control means.

The susceptibility index can be used, in some embodiments, to adjust the computer infrastructure (hardware and/or software) so that a new and/or improved susceptibility condition can be realized. In some embodiments, this results in an improved susceptibility index. For example, an email misconfiguration, a computer and/or network process, a threat detection process, and/or a data storage process can be adjusted based on the susceptibility index. This can reduce exposure to, for example, data exfiltration, denial of service including distributed denial of service attacks, and improvement in detection of malware. By remediating at least some of the identified issues, a subsequent computation can be performed to result in an improved susceptibility index for the entity.

Figure 2A:
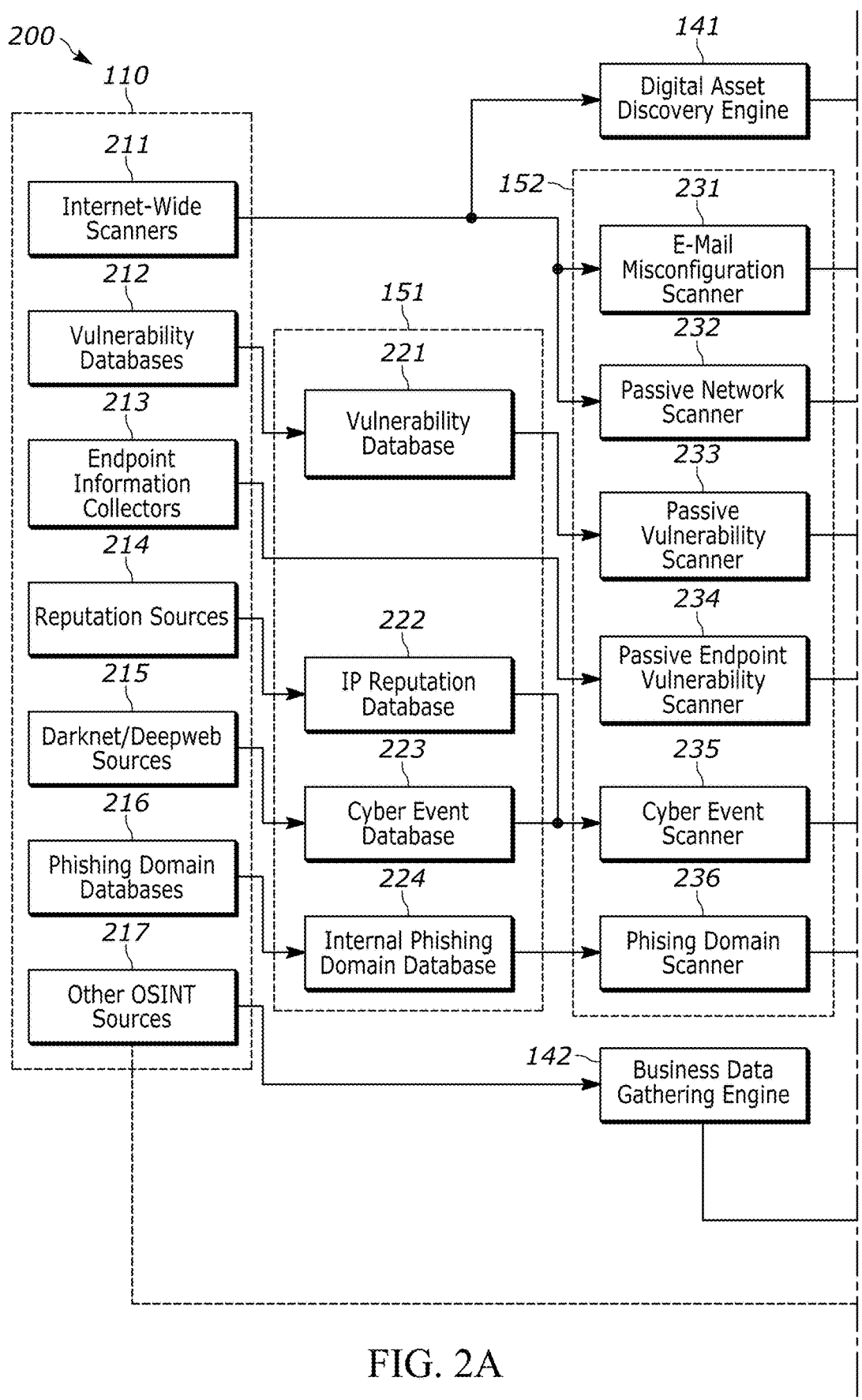
FIGS. 2A-2B illustrate an embodiment of a system that estimates the ransomware factor based on the data gathered non-intrusively to compute the ransomware susceptibility according to the present teaching.
Figure 2B:
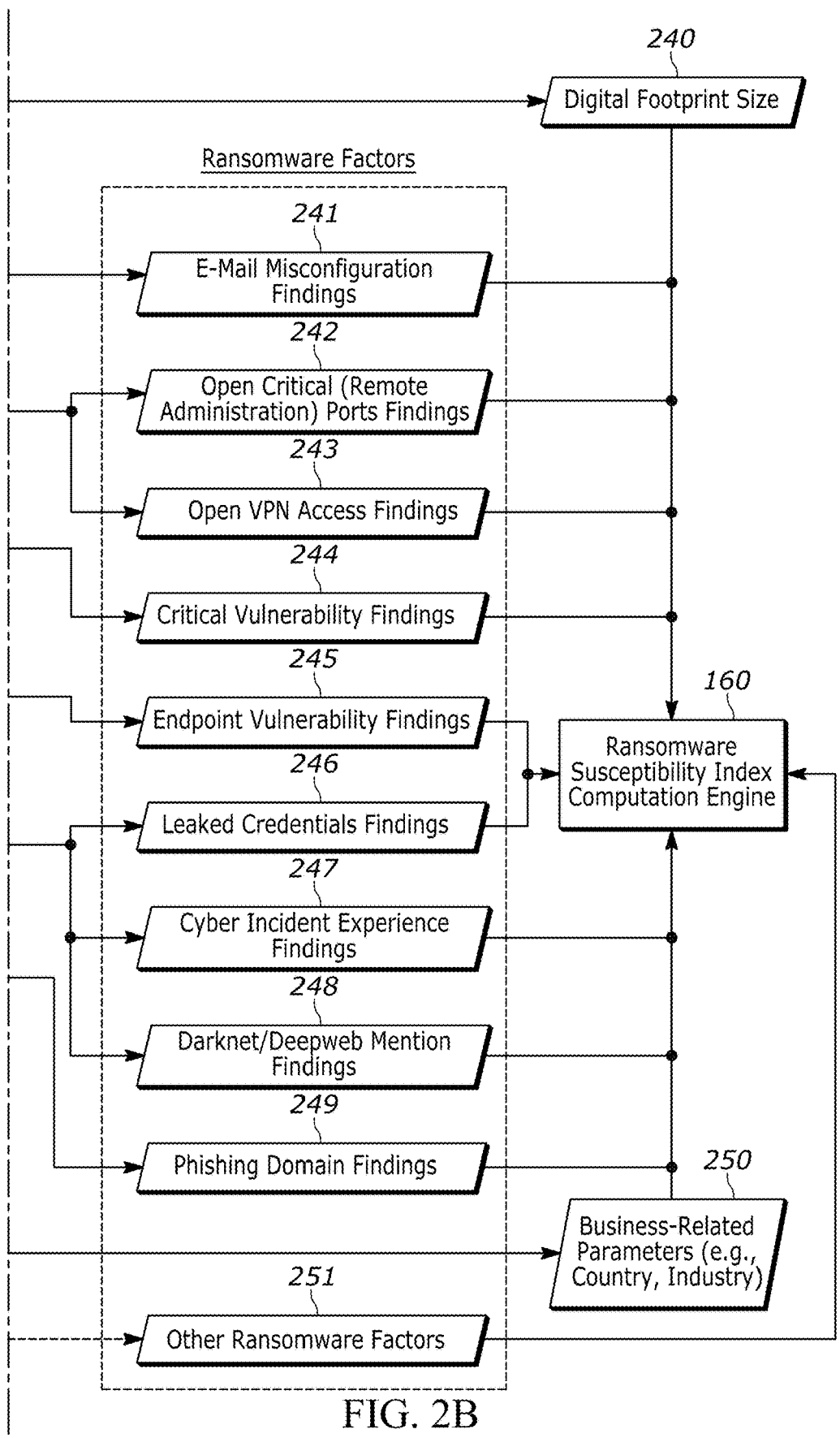

FIGS. 2A-2B illustrate a block diagram 200 of an embodiment of a system for ransomware factors generation for the computation of ransomware susceptibility index. Several data sources 110 are used to gather necessary data to compute the ransomware susceptibility index as shown in the FIGS. 2A-2B. This includes internet-wide scanners 211, vulnerability databases 212, endpoint information collectors 213, reputation sources 214, darknet/deepweb sources 215, phishing domain databases 216 and other OSINT sources 217. Persons skilled in the art will appreciate that these are just examples. Some databases in the cyber intelligence database system 151 and some scanners in the cyber intelligence scanner system 152 are displayed. The ransomware factors provided in the embodiment of FIGS. 2A-2B comprise a set of examples including, e-mail misconfiguration findings 241, open critical ports findings 242, open VPN access findings 243, critical vulnerability findings 244, endpoint vulnerability findings 245, leaked credentials findings 246, cyber incident experience findings 247, darnet/deep-web mention findings 248, and phishing domain findings 249. Some or all of these findings can also be remediated by the system as described above in connection with FIGS. 1A-B. Also, the set can be extended with other ransomware factors 251 generated from OSINT data sources 217.

The digital asset discovery engine 141 gathers information from data sources 110 such as internet-wide scanners 211, for example Shodan, to compute the digital footprint size 240. The digital footprint size 240 can be considered as a ransomware factor and it is delivered to the ransomware susceptibility index computation engine 160.

An e-mail misconfiguration scanner 231 gathers information about the possible misconfiguration on the entity's e-mail systems from data sources 110, for example internet-wide scanners 211, through the network 120. The entity email system information is provided to the passive vulnerability scanner 232 by the digital asset discovery engine 141. The misconfiguration information is related to the issues that may enable cyber criminals to execute an e-mail phishing attacks followed by a ransomware attack. For example, missing DMARC record indicates that the entity may not prevent spoofing emails that lead e-mail phishing. The e-mail misconfiguration scanner 231 sends the email misconfiguration findings 241 to the ransomware susceptibility index computation engine 160.

A passive network scanner 232 gathers information about the open critical (remote administration) ports on the assets of the entity and also possible open virtual private network (VPN) access from data sources 110, for example internet-wide scanners 211, through the network 120. The asset information is provided to the passive vulnerability scanner 232 by the digital asset discovery engine 141. An open remote administration/desktop port (RDPs) or an open VPN access, for example, may lead ransomware groups to load the ransomware inside the entity's system. The passive network scanner 232 sends the open critical port findings 242 and open VPN access findings 243 to the ransomware susceptibility index computation engine 160.

A passive vulnerability scanner 233 scans a vulnerability database 221 in the cyber-intelligence database system 151. The vulnerability database gathers information about the possible critical vulnerabilities on the assets of the entity from data sources 110, for example vulnerability databases 212, through the network 120. The asset information is provided to the passive vulnerability scanner 232 by the digital asset discovery engine 141. An example of vulnerability database is The National Vulnerability Database (NVD) managed by US National Institute of Standards and Technology (NIST). The critical vulnerabilities with high exploitability, for example the vulnerabilities that allow remote code execution, can be exploited by cybercriminals to execute ransomware attacks. The passive vulnerability scanner 233 sends the critical vulnerability findings 244 to the ransomware susceptibility index computation engine 160.

A passive endpoint vulnerability scanner 234 gathers information about the possible critical vulnerabilities on the endpoint assets of an entity from data sources 110, for example endpoint information collectors 213 that gather operating system and browser information of endpoints, through the network 120. The asset information is provided to the passive endpoint vulnerability scanner 232 by the digital asset discovery engine 141. A critical vulnerability that allows remote code execution on an endpoint system, for example, can be exploited by cybercriminals to execute ransomware attacks. The passive endpoint vulnerability scanner 234 sends the endpoint vulnerability findings 245 to the ransomware susceptibility index computation engine 160.

A cyber event scanner 235 gathers information about the past cyber events that resulted in ransomware attacks and/or data breaches for the entity, leaked credentials, and also IP reputation information on the assets of an entity from an IP reputation database 222 and a cyber event database 223 in the cyber intelligence database system 151. The IP reputation database 222 is updated from data sources 110, for example reputation sources 214 that provides blacklists of IP addresses due to their involvement in malicious activities such as botnet infection, malware propagation, spam propagation, etc., through the network 120. The cyber events database 223 is updated from data sources 110, for example darknet/deepweb sources that provides information about any mention of the entity name or its assets, leaked credentials, and also information on the ransomware attacks towards the entity in the past, through the network 120. The asset information is provided to the cyber event scanner 235 by the digital asset discovery engine 141. A ransomware attack and a major cyber incident experienced in the past by an entity can be correlated to ransomware attacks in the future. The leaked credentials can be used to execute email phishing attacks and/or credential stuffing attacks to infiltrate the entity's system for ransomware attacks. The assets that become a part of botnet infection campaign, malware propagation, etc., shows that some assets have been controlled by cybercriminals in the past. The cyber-event scanner 235 sends the leaked credential findings 246, cyber incident experience findings 247, and darknet/deepweb mention findings 248 to the ransomware susceptibility index computation engine 160.

A phishing domain scanner 236 scans an internal phishing domain database 224 in the cyber intelligence database system 151 for the domain assets of the entity. The internal phishing domain database 224 gathers information about the possible phishing domains on the assets of the entity from data sources 110, for example external phishing domain databases 216, through the network 120. The asset information is provided to the phishing domain scanner 236 by the digital asset discovery engine 141. The phishing domains are, for example, the domains registered by cybercriminals to deceive entity employees to provide sensitive information such as login information to a system of the entity, an access which can be used by threat actors to infiltrate the entity's system to install a ransomware. The phishing domain scanner 236 sends the phishing domain findings 249 to the ransomware susceptibility index computation engine 160.

The business data gathering engine 141 gathers information from OSINT sources 217, for example LinkedIn, to gather the business-related parameters 250. The business-related parameters 250 can be considered as a ransomware factor and it is delivered to the ransomware susceptibility index computation engine 160.

FIG. 3 illustrates a general equation 300 of an embodiment of a system for ransomware susceptibility computation. One skilled in the art will appreciate that the general equation 300 in the embodiment is an example provided for representation purposes only and the equation used for various embodiments of the computation may differ. For example, the equation can change with the changing dynamics of the ransomware attacks. However, any equation for the ransomware susceptibility index computation may follow the principles provided for the general equation 300. The general equation 300 depicts the base algorithm works in the ransomware susceptibility index computation engine 160.

A coefficient 310 derived from the digital footprint size 240 is devised. The parameter 310 is proportional to the ransomware susceptibility index to reflect the impact of the digital footprint size 240 on the ransomware susceptibility.

Coefficients 320, 330, and 340 derived from the business-related parameters 250 are also devised. The parameters are proportional to the ransomware susceptibility index to reflect the impact of the country, industry, and the business size of the entity on the ransomware susceptibility. One skilled in the art will understand that the business size of the company can be represented by any of the business-related parameters such as the number of employees, annual net revenue, market size, etc. or combination of those parameters.

The general equation 300 sums the impact of each ransomware factor represented in FIGS. 2A-2B. For each ransomware factor, the product of a "factor value" 370 derived from the related findings and a "factor coefficient" 360 provides the impact value of the ransomware factor. When the impact value of a ransomware factor is relevantly much higher than the others, it may dominate the ransomware susceptibility index and may cause an incorrect result. To avoid such cases, a maximum impact value 350 is determined for each ransomware factor. Thus, the impact value of a ransomware factor is the minimum value of the values; (1) the maximum impact value 350; and (2) the product of the factor coefficient 360 and the factor value.

A nominalization value 380 is devised to keep the ransomware susceptibility index inside a certain range, for example between 0.0 and 1.0.

Figure 4:
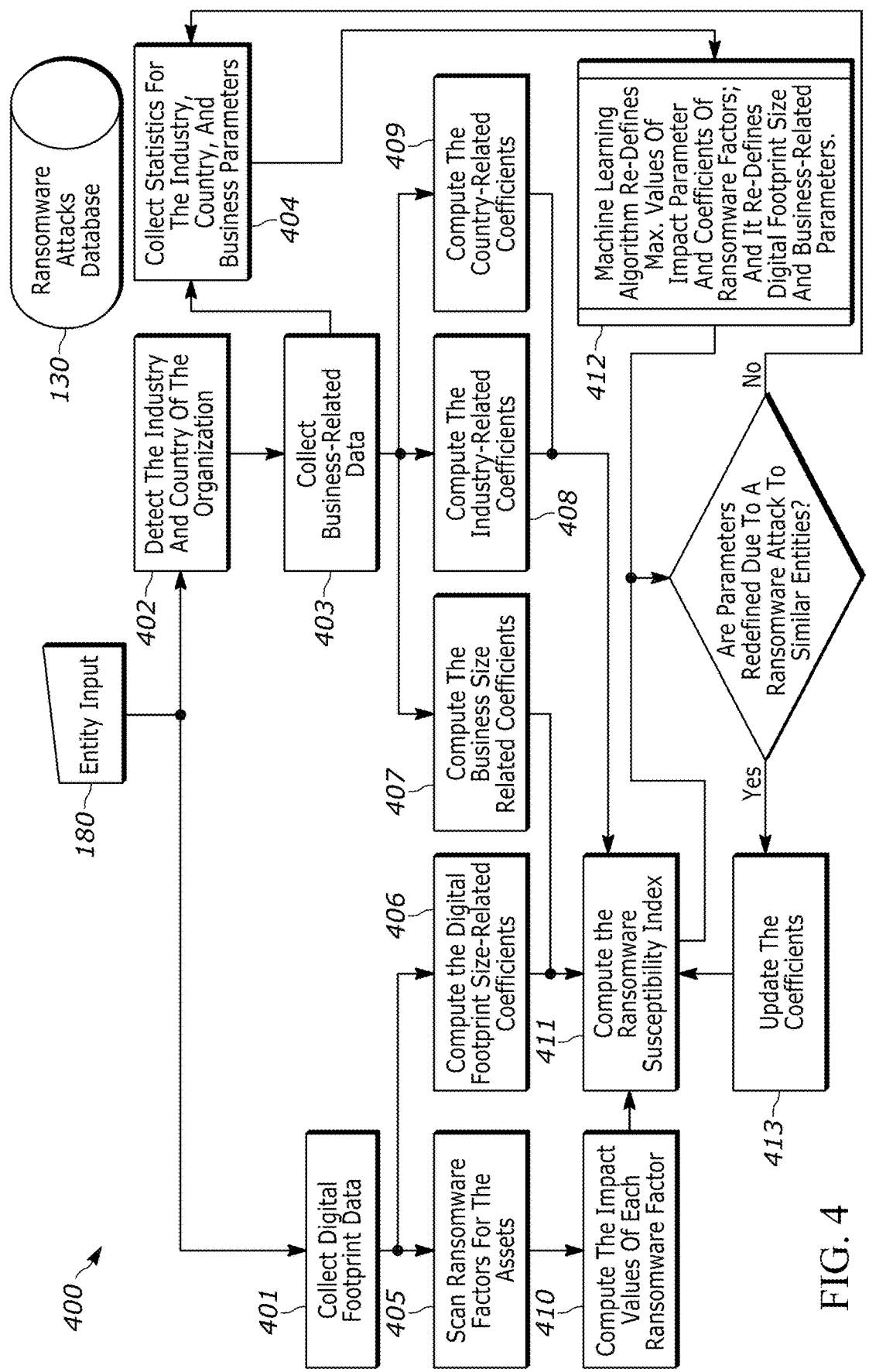
FIG. 4 illustrates a flow diagram of an embodiment of a method for computation of ransomware susceptibility index of a given entity and re-computation of the index with the help of a machine learning algorithm according to the present teaching.

FIG. 4 illustrates a flow diagram 400 of an embodiment of a system for ransomware susceptibility index computation according to the present teaching. This embodiment of the system depicts the flow diagram of ransomware computation.

Referring to both FIG. 4 and back to FIG. 1B, an entity input 180 is provided to the business intelligence unit 140 that includes the digital asset discovery engine 141 and the business data gathering engine 142. The entity input 180 is delivered to a collect digital footprint data module 401 in the digital asset discovery engine 141 and a detect the industry and country of the organization module 402 in the business data gathering engine 142. The term module as used herein refers to software in an engine or scanner that executes codes to perform certain calculations based on given inputs and the computer resources used to execute that software. The computer resources used to execute the application may refer to, but are not limited to, partial resources of hardware associated with a computer system that has one or more CPUs, RAMs, ROMs, data storage units, I/O adapters, and communication adapters.

The collect digital footprint data module 401 in the digital asset discovery engine 141 gathers the digital footprint information and sends the data to a scan ransomware factors for the assets module 405 in the cyber intelligence scanners system 152 and a compute the digital footprint size-related coefficients module 406 in the ransomware susceptibility index computation engine 160.

The detect the industry and country of the organization module 402 in the business data gathering engine 142 detects the country and industry of the entity from data sources 110 through network 120 and sends the data along with the entity input information to a collect business-related data module 403 in the business data gathering engine 142.

The collect business-related data module 403 gathers business-related parameters 250 of the entity from data sources 110 through network 120 and sends the data along with the country and industry data to a compute business size-related coefficient module 407, a compute industry-related coefficient module 408, and a computer country-related coefficient module 409, all in the ransomware susceptibility index computation engine 160. The collect business-related data module 403 also sends country and industry data to collect statistics for the industry, country, and business parameters module 404 in the calibration engine 170.

The collect statistics for the industry, country, and business parameters module 404 scans the ransomware attacks database 130 to detect if there were any ransomware attacks against the entities with similar business parameters. If there were, it sends the ransomware attack information to the machine learning algorithm 412 in the calibration engine 170.

The scan ransomware factors for the assets module 405 initiate scanners in the cyber intelligence scanner system 152 and gather ransomware factors. It sends the ransomware factors to a compute the impact of each ransomware factor module 410.

The compute the digital footprint size-related coefficients module 406, the compute business size-related coefficient module 407, the compute industry-related coefficient module 408, the compute country-related coefficient module 409, and the compute the impact values of each ransomware factor module 410 send the coefficient results to a compute the ransomware susceptibility index module 411 in the ransomware susceptibility index computation engine 160. The compute the initial ransomware susceptibility index module 411 executes the operations regarding the general equation 300 and computes the initial ransomware susceptibility index.

The machine learning algorithm 412 re-defines maximum values of impact values and coefficients of ransomware factors. The machine learning algorithm also re-defines digital footprint size- and business-related coefficients based on the ransomware attack data provided by the collect business-related data module 404, which could be, for example, data on ransomware attacks for similar entities.

If there are redefined parameters provided by the machine learning algorithm due, for example, to a ransomware attack to similar entities, then an update-the-coefficients module 413 in the ransomware susceptibility index computation engine 160 updates the coefficients used in the ransomware susceptibility index computation and it sends the updated coefficients back to the compute the ransomware susceptibility index module 411.

EQUIVALENTS

While the Applicant's teaching is described in conjunction with various embodiments, it is not intended that the applicant's teaching be limited to such embodiments. On the contrary, the Applicant's teaching encompass various alternatives, modifications, and equivalents, as will be appreciated by those of skill in the art, which may be made therein without departing from the spirit and scope of the teaching.

What is claimed is:

1. A method of cyber-risk assessment, the method comprising:
   a) populating a database with ransomware attack information non-intrusively gathered from a plurality of data sources;
   b) receiving a request for a ransomware susceptibility assessment of an entity associated with a domain name;
   c) discovering a digital footprint of an entity in response to the associated domain name using non-intrusive information gathering;
   d) collecting commercial information associated with the entity in response to the domain name;
   e) scanning the database in response to the discovered digital footprint and generating at least one ransomware factor associated with the entity in response to the scan;
   f) computing an impact parameter and a ransomware factor coefficient based on the collected commercial information;
   g) computing an entity susceptibility index based on the impact parameter, the ransomware factor coefficient, and the at least one ransomware factor; and
   h) identifying a ransomware attack, re-populating the database in response to the identified ransomware attack, and re-computing at least one of an impact parameter or a ransomware factor coefficient based on the identified new ransomware attack to provide a cyber-risk assessment to a user.

2. The method of claim 1 further comprising:
   a) identifying a computer process associated with at least one ransomware factor;
   b) adjusting the identified computer process in response to the susceptibility index; and
   c) recomputing an entity susceptibility index, thereby providing an improved cyber-risk assessment.

3. The method of claim 1 wherein the re-computing at least one of an impact parameter or a ransomware factor coefficient based on the identified new ransomware attack is performed with a machine learning method.

4. The method of claim 3 wherein the machine learning method is based on an Convolutional Neural Network (CNN) for regression prediction algorithm.

5. The method of claim 1 wherein the ransomware information comprises at least one of an email misconfiguration, an open critical port finding, an open VPN finding, a critical vulnerability finding, an endpoint vulnerability finding, a leaked credentials finding, a cyber-incident finding, a darknet/deepweb mention finding, or a phishing domain finding.

6. The method of claim 1 wherein the commercial information comprises industry information.

7. The method of claim 1 wherein the commercial information comprises business-related information of the entity.

8. The method of claim 1 wherein the commercial information comprises at least one of an industry type, an industry size, or an industry geography.

9. The method of claim 1 wherein the commercial information comprises at least one of an industry of the entity, a number of employees of the entity, a country of operation of the entity, a revenue size of the entity, a market size of the entity, or a digital footprint size of the entity.

10. The method of claim 1 wherein the impact parameter comprises a number associated with at least some of the commercial information.

11. The method of claim 1 wherein the ransomware factor coefficient comprises a number associated with a relative importance of the at least one ransomware factor compared to at least one other ransomware factor.

12. The method of claim 1 further comprising performing a remediation action in response to a cyber-risk assessment.

13. The method of claim 12 wherein the remediation action comprises adjusting a computer process associated with at least one of an email misconfiguration, an open critical port finding, an open VPN finding, a critical vulnerability finding, an endpoint vulnerability finding, a leaked credentials finding, a cyber-incident finding, a darknet/deepweb mention finding, or a phishing domain finding.

14. A system for cyber-risk assessment, the system comprising:
   a) a processor configured to perform the following operations:
      i) populate a database with ransomware attack information non-intrusively gathered from a plurality of data sources;
      ii) receive a request for a ransomware susceptibility assessment of an entity associated with a domain name;
      iii) discover a digital footprint of an entity in response to the associated domain name using non-intrusive information gathering;
      iv) collect commercial information associated with the entity in response to the domain name;
      v) scan the database in response to the discovered digital footprint and generate at least one ransomware factor associated with the entity in response to the scan;
      vi) compute an impact parameter and a ransomware factor coefficient based on the collected commercial information;
      vii) compute an entity susceptibility index based on the impact parameter, the ransomware factor coefficient, and the at least one ransomware factor; and
      viii) identify a ransomware attack, re-populate the database in response to the identified ransomware attack, and re-compute at least one of an impact parameter or a ransomware factor coefficient based on the identified new ransomware attack to provide a cyber-risk assessment.

15. The system for cyber-risk assessment of claim 14 further comprising:
   a) a second processor configured to perform the following operations:
      i) identify a computer process associated with at least one ransomware factor;
      ii) adjust the identified computer process in response to the susceptibility index; and
      iii) recompute an entity susceptibility index to provide an improved cyber-risk assessment to a user.

16. The system of claim 15 wherein the processor is one or more processors operating in a cloud environment.

17. The system of claim 15 wherein the re-computing at least one of an impact parameter or a ransomware factor coefficient based on the identified new ransomware attack is performed with a machine learning method.

18. The system of claim 15 further comprising a processor configured to perform a remediation action in response to the cyber-risk assessment, the remediation action comprising at least one of adjusting a computer process associate with at least one of an email misconfiguration, an open critical port finding, an open VPN finding, a critical vulnerability finding, an endpoint vulnerability finding, a leaked credentials finding, a cyber-incident finding, a darknet/deepweb mention finding, or a phishing domain finding.

19. A non-transitory computer-readable storage medium storing instructions that, when executed by one or more processors, cause the one or more processors to perform operations that determine a cyber-risk assessment for a user, the operations comprising:
  a) populating a database with ransomware attack information non-intrusively gathered from a plurality of data sources;
  b) receiving a request for a ransomware susceptibility assessment of an entity associated with a domain name;
  c) discovering a digital footprint of an entity in response to the associated domain name using non-intrusive information gathering;
  d) collecting commercial information associated with the entity in response to the domain name;
  e) scanning the database in response to the discovered digital footprint and generating at least one ransomware factor associated with the entity in response to the scan;
  f) computing an impact parameter and a ransomware factor coefficient based on the collected commercial information;
  g) computing an entity susceptibility index based on the impact parameter, the ransomware factor coefficient and the at least one ransomware factor; and
  h) identifying a ransomware attack, re-populating the database in response to the identified ransomware attack, and re-computing at least one of an impact parameter or a ransomware factor coefficient based on the identified new ransomware attack to provide a cyber-risk assessment to the user.

* * * * *